United States Patent [19]
Pickles et al.

[11] 3,790,943
[45] Feb. 5, 1974

[54] RADIO FREQUENCY ANTENNA SYSTEM
[75] Inventors: Sidney Pickles, Colusa, Calif.; Dean S. Thornberg, Salt Lake City, Utah
[73] Assignee: E-Systems, Inc., Dallas, Tex.
[22] Filed: Feb. 9, 1972
[21] Appl. No.: 224,783

[52] U.S. Cl............. 343/106 R, 343/833, 343/761, 343/791
[51] Int. Cl.............................................. G01s 1/44
[58] Field of Search 343/106 R, 833, 761, 872, 791

[56] References Cited
UNITED STATES PATENTS

| | | | |
|---|---|---|---|
| 3,153,239 | 10/1964 | Adams................................ | 343/872 |
| 3,141,169 | 7/1964 | Bellis et al. ...................... | 343/106 R |
| 3,281,843 | 10/1966 | Plummer......................... | 343/106 R |
| 2,726,389 | 12/1955 | Taylor................................ | 343/761 |

*Primary Examiner*—Maynard R. Wilbur
*Assistant Examiner*—S. C. Buczinski

[57] ABSTRACT

Tactical radio navigation systems provide distance measuring information to an interrogating aircraft in response to pairs of interrogation pulses received at a beacon transponder, the system also provides bearing and identification information. The transponder receives pairs of interrogation pulses which are decoded into a single pulse for operation of a reply transmitter. Bearing, distance and identification determining signals are generated by the reply transmitter and its antennas. A single antenna functions to both receive the interrogation pulses and radiate the position determining signals. To provide the required bearing information, the antenna radiates pulses from a central antenna array that is stationary with respect to a support housing. These pulses are modulated at a 15 Hz frequency by parasitic elements rotating around the stationary central array. Further modulation of the transmitted pulses at a 135 Hz frequency, superimposed on the 15 Hz frequency, is provided by additional parasitic elements also rotating about the central antenna array. Both the low band frequency parasitic elements and the high band frequency parasitic elements have a configuration to provide improved radiation from the antenna above the horizontal. Also to improve the antenna radiation pattern, the 135 Hz parasitic elements are positioned on a rotating drum of a dielectric material, such as fiberglass. To still further improve the amount of radiation energy above the horizontal reference, radio frequency chokes are coupled to the central antenna array in the feed line from the signal transmitter.

22 Claims, 9 Drawing Figures

RADIO FREQUENCY ANTENNA SYSTEM

This invention relates to a radio navigation antenna system and more particularly to a radio navigation system with improved radiation energy uptilt above a horizontal reference.

Radio navigation systems, such as TACAN, provide bearing information and distance information by a beacon station which radiates pulses according to a rotating multilobe directional pattern. Each time the low frequency (e.g., 15 Hz) lobe of this patern passes a given reference point, e.g., a north reference, a reference signal is emitted. Rotation of the antenna pattern, in effect, amplitude modulates the pulses to provide an amplitude envelope thereon. The phase information of this envelope with respect to the reference signal varies at different azimuthal angles from the beacon. In a receiver of an interrogating craft these pulses are received from the beacon station and the envelope is separated from the pulses by a filter and the phase of this envelope is compared with the phase of the reference signal to give bearing indication. The distance data is derived by electronically measuring the net time elapsing between transmission of an interrogation pulse pair and receipt of a reply pulse pair from the surface beacon. Subtracting the processing delay, the resultant time interval is directly proportional to the line of sight distance between the interrogating aircraft and the beacon.

Heretofore, distance measuring systems required the use of a high power beacon transmitter to generate interrogating transmission at sufficient power to enable the interrogating aircraft to obtain a position fix. Such high power transmitters are difficult to construct and maintain to reliably provide the requisite information signals. Considering that many TACAN systems are portable, this further increases the complexity of the source of transmitted energy.

With regard to the antenna itself, generally speaking, prior antennas of the pseudoportable type provided a narrow vertical aperture and had relatively poor electrical performance. Further, the weight and power consumption of the spin motor and associated speed control was also found to be excessive.

Several attempts have been made to eliminate the re-radiation reflection problem in radio navigation systems. These attempts have employed antennas that used a cardioid pattern of a central radiator with 15 cycle reflectors to excite mechanical 135 cycle reflectors. Under these conditions, the 135 cycle reflectors have not been uniformly illuminated with the result in the production of a considerable amount of 120 Hz and 150 Hz modulations in addition to the 15 cycle and 135 cycle modulations. In this type of antenna, the configuration of metal parts within the confines of the modulating members provides particular susceptibility to the production of re-radiation signals. The modulating elements are individually nondirectional and as such re-radiate in all directions and as such some of the radiation returns to the central radiator. Radiation not along the radius of the central radiator strikes the metal reflective surface at an oblique angle and the wave reflected from the oblique incidence is no longer in a vertical plane. Since this energy comes from the modulating elements it is information energy with the phase thereof not predictable. Therefore, when a receiving antenna on an interrogating aircraft receives these signals the results are usually quite different from the correct azimuth phase. A feature of this invention is the elimination of the type designs described above.

In accordance with the present invention, an improved radiation pattern is accomplished by controlling the environment of the radiating and reflector elements. There is a minimum of oblique metal surfaces within the confines of the antenna system which would produce or convert radiation into a plane at angles other than that desired. Thus, the antenna of the present invention provides improved effective versus apparent vertical aperture. A central array of the antenna exhibits improved uptilt of the radiation pattern and slope characteristics across the usual radio navigation frequency spectrum. Still another feature of the present invention is the control of the sideband radiation pattern by means of the parasitic reflectors and the mounting thereof on a nonmetallic rotating drum. The nonmetallic underside of the rotating drum also reduces radio frequency spillover and reduces the energy radiated below the horizon of the antenna.

To better understand the invention, a brief discussion of the general TACAN principles as related to the present radio navigation system will be given. Tactical air navigation (TACAN) is a radio air navigation system of the polar coordinate type which provides an aircraft with distance measuring information (DME) and bearing information. Usually, a meter in an interrogating aircraft indicates, in nautical miles, the distance of the aircraft from a surface beacon. Another meter indicates direction of flight in degrees of bearing with respect to the geographic location of the surface beacon and magnetic north. By knowing the bearing and distance from a specific geographic point, i.e., the ground station beacon transponder, the pilot of an aircraft can fix his position. An identification signal from the surface beacon enables the pilot to identify which beacon he is receiving information from and therefore allows him to plot his geographic location.

The distance measuring concept used in TACAN equipment is an outgrowth of radar-ranging techniques, wherein distance is determined by measuring the round-trip travel time of pulsed radio frequency energy. A return signal (echo) of the radiated energy is dependent on natural reflections of the radio waves. Radio navigation systems for use with the antenna of the present invention are located at specific geographic positions and generate artificial replies rather than depending on natural reflections. The airborne equipment generates timed interrogation pulse-pairs that are received by the surface beacon-transponder system and decoded. After a 50-$\mu$s delay, the transponder transmits a reply signal. The round-trip time is then converted to distance from the ground facility by the airborne DME equipment. With the ground position known and the distance known, the aircraft location can be positioned on the perimeter of a circle whose radius is equal the measured distance.

The timing of the pulses generated is of primary importance for the distance information. To convey bearing information to an interrogating aircraft, amplitude modulation of the pulses from the ground transponder are employed. Bearing information is produced by a specific directional-radiation pattern rotated around a vertical axis. This signal, when properly referenced to magnetic north, as explained, identifies the aircraft direction from the ground facility. The magnetic north bearing information and the distance-data gives a two point fix for a specific aircraft location.

In a system wherein the present invention is embodied, radio frequency energy is fed to a stationary central antenna array of an antenna system. This central array has no directivity in the horizontal plane. Vertical parasitic elements are rotated around the central array at a fixed number of revolutions per second. The distance between the central array and the parasitic elements is established to obtain a desired cardioid radiation pattern. To an aircraft at a specific location, the distance-data pulses would contain a low frequency amplitude-modulated signal due to the rotation of the cardioid radiation pattern. Bearing information can be obtained by comparing the low frequency modulated signal with a reference frequency signal received from the ground facility. The phase relationship between the two low frequency signals will be dependent on the location of the receiving aircraft and the cardioid pattern.

A suitable reference signal pulse transmitted at the same fixed phase of the low frequency will serve as well as a complete wave for the reference signal. These signals are sent out when the maximum of the rotating cardioid pattern aims due magnetic east, provided the antenna is aligned due magnetic north.

For improved accuracy, a group of additional parasitic elements, mounted a fixed number of degrees apart, also rotates around the central antenna array along with the low frequency elements and further modify the cardioid radiation pattern. Although the cardioid pattern is still predominant, it is altered by superimposed ripples. The interrogating aircraft now receives the low frequency with a higher frequency ripple amplitude modulated on the distance data reference and squitter pulses. To furnish a suitable reference for measuring the phase of the high frequency component of the envelope wave, a coded high frequency reference signal pulse is transmitted from the beacon transponder.

In one embodiment of the present invention, a radio frequency antenna system comprises a housing that includes a drive motor. A central antenna array of omnidirectional antennas is enclosed in an antenna tube mounted to the support housing to be fixed in position with respect thereto. A plurality of spaced parasitic antenna elements are positioned from the central antenna array on a support means coupled to the drive motor. The drive motor rotates the support means and the parasitic antenna elements around the central antenna array to modulate the electromagnetic waves radiating therefrom. A series of radio frequency chokes are connected to the central array to provide improved uptilt to the radiation energy and minimum re-radiation energy.

A more complete understanding of the invention and its advantages will be apparent from the specification and claims and from the accompanying drawings illustrative of the invention.

Referring to the drawings.

Figure 1:
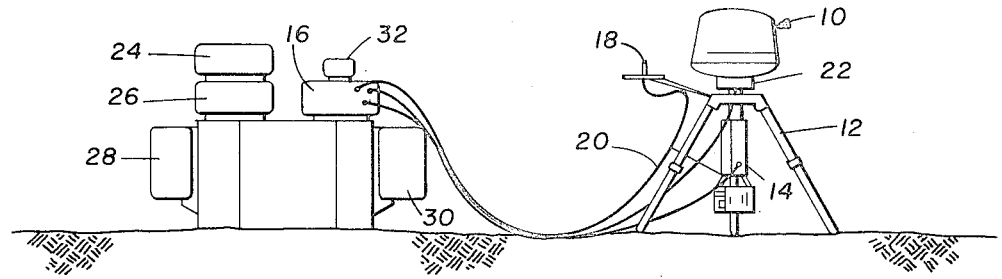
FIG. 1 illustrates a portable installation of a radio navigation system employing the antenna of the present invention.

Referring to FIG. 1, there is shown a typical installation of a radio navigation system wherein an antenna 10 is mounted on a tripod 12 in an area preferably free from as much ground reflection and clutter as possible. A control unit 14 is coupled to the antenna 10 and provides for rotation of the parasitic elements (to be described) in response to signals from a control/transfer unit 16. Also mounted to the tripod 12 is a monitor antenna 18 which connects to the control/transfer unit 16 through cabling 20. The monitor antenna 18 provides means for checking the operation of the antenna 10. The control transfer unit 16 also connects to a trigger sensor unit 22 as part of the antenna 10.

Interrogation pulses received by the antenna 10 are transmitted to the control/transfer unit 16 for processing in receiver/transmitter units 24 and 26 both of which are similar in construction and operation to provide a dual configuration, standby capability. System monitoring signals received by the monitor antenna 18 are coupled through the control/transfer unit 16 to monitors 28 and 30. The monitor units provide a continual check on the operation of the system to insure reliability of system operation. An oscilloscope 32 connects to the control/transfer unit 16 to provide visual information on the operation of the system.

Figure 2:
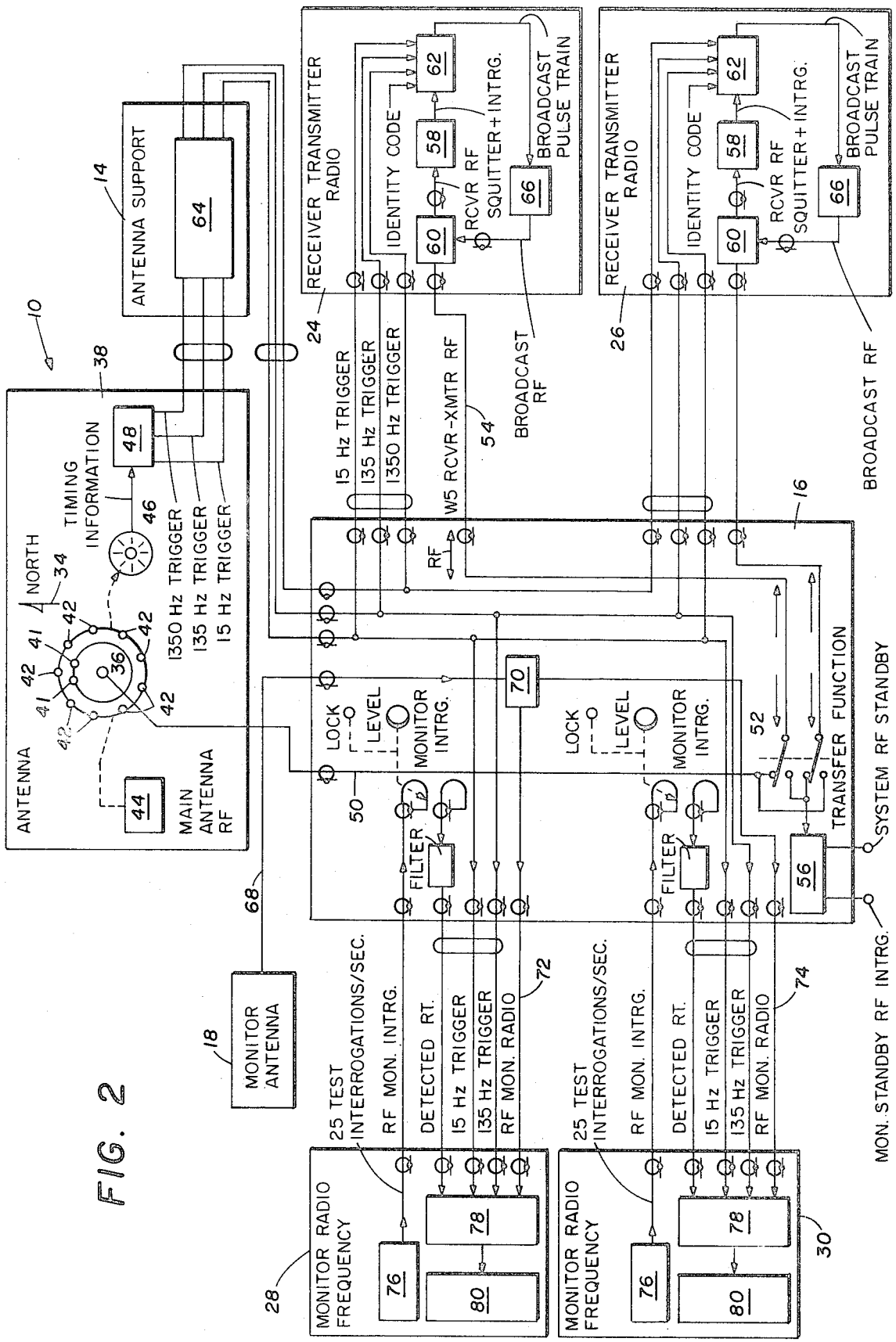
FIG. 2 is a block diagram of a dual configuration radio navigation system employing the antenna of the present invention.

Referring to FIG. 2, there is shown a block diagram of the various units of FIG. 1 including a block representing the antenna 10. For correct orientation of the antenna with reference to a reference mark, there is included as part of the antenna structure a reference target alignment index 34. When setting up the antenna for system operation, proper orientation is necessary. Within the structure of the antenna 10 is a central antenna array 36 that is mounted to a housing 38 and held stationary with respect thereto.

The central antenna array 36 receives the interrogation pulse pairs from interrogating aircraft and also radiates distance, bearing and identification information pulses. The transmitted pulses are modulated at a first frequency by means of parasitic elements 40 mounted to rotate about the central array 36. Superimposed on this low frequency modulation is a higher frequency modulation provided by parasitic elements 42. In the embodiment shown, there are two low frequency parasitic elements and nine high frequency parasitic elements. Both these sets of elements are rotatable about the central array 36 by means of a motor drive 44 mechanically coupled to the supporting structure for the elements. Also driven by the motor 44 is a light disc 46 for providing timing information to a reference trigger source 48.

Aircraft interrogation radio frequency signals from the central antenna array 36 are transmitted to the control/transfer unit 16 by means of a coaxial cable 50. Depending on the position of a transfer switch 52, signals from the antenna are routed to either the receiver/transmitter 24 or the receiver/transmitter 26. In the position shown for the transfer switch 52, the transmitter 24 processes the interrogation pulse pair received from the transfer unit 16 over a coaxial cable 54. The transmitter 26 is then in a standby mode and responds to test interrogations and produces test replies to a dummy load 56. If the transmitter 24 fails, the monitors 28 and 30 sense the failure and send an alarm signal which causes the transfer switch 52 to switch to the standby transmitter 26. In this sutation, then the transmitter 24 becomes the standby unit, the monitors 28 and 30 hold in memory the failed parameter for maintenance purposes.

Fundamentally, the transmitters 24 and 26 detect and decode weak interrogations at one frequency and generate higher power replies at another frequency. Another function of the transmitter units 24 and 26 is to produce a Morse code identification message periodically for an interrogating aircraft to identify the transmitting source of distance and bearing information received. The receiver section of the receiver/transmitter 24 and 26 receives and logically recognizes aircraft interrogation in a function module represented by block 58. This network is coupled to a duplexor function module represented by block 60. Interrogations arriving at the antenna 36 are applied to a preselector included as part of the duplexor module 60 and those arriving at the correct frequencies pass through to be applied to the function module 58 which provides output pulses to an encode module represented by block 62. The encode module 62 also receives timing pulse information from the reference trigger sensor 48 through the control unit 14 and the control/transfer unit 16. The control unit 14 includes a reference trigger amplifier 64 for amplification of the timing pulses. Pulses received at the encode module 62 from the module 58 are converted into high frequency radio impulses at a transmit frequency 63 MHz away from the received frequency. The output pulse train consists of reply pulses, position (squitter) pulses and identify pulses; all output pulses are used to carry the position information. Also generated in the encode module 62 are the reference pulses synchronized with the timing pulse input.

Broadcasted pulse trains from the module 62 are coupled to a transmit module represented by block 66 which has an output coupled to the duplexor module 60. Pulse trains at the output of the module 66 include the distance, bearing and identification information in a timed relationship with referenced pulse information and identity pulse information. These pulses are transmitted to the central antenna array 36 of the antenna 10 through the coaxial cables 50 and 54 and the transfer switch 52.

As mentioned, the system is continuously monitored by means of a monitor antenna 18 coupled to the transfer unit 16 through a coaxial cable 68. Signals received from the antenna 18 are processed through a divider circuit 70 of the control transfer unit 16 and distributed to the monitors 28 and 30 over coaxial cables 72 and 74, respectively. Also received by the monitors 28 and 30 are trigger signals from the reference trigger amplifier 64. Each of the monitors 28 and 30 includes a test interrogation generator (block 76), a signal analysis and mode stepping module (block 78), and a display module (block 80). As explained, if the functional receiver/transmitter fails, the monitors sense the failure, store the failure in memory and switch system operation to the standby transmitter. Both monitors 28 and 30 are active at all times and both must sense a failure before a transfer or shutdown occurs. A shutdown occurs under certain operating conditions or if both transmitters 24 and 26 have failed. The monitors 28 and 30 are solely for the purpose of system monitoring and testing and do not provide for the basic function of the system, that is, providing distance, bearing and identification information from the centrla antenna relay 36.

Figure 3:
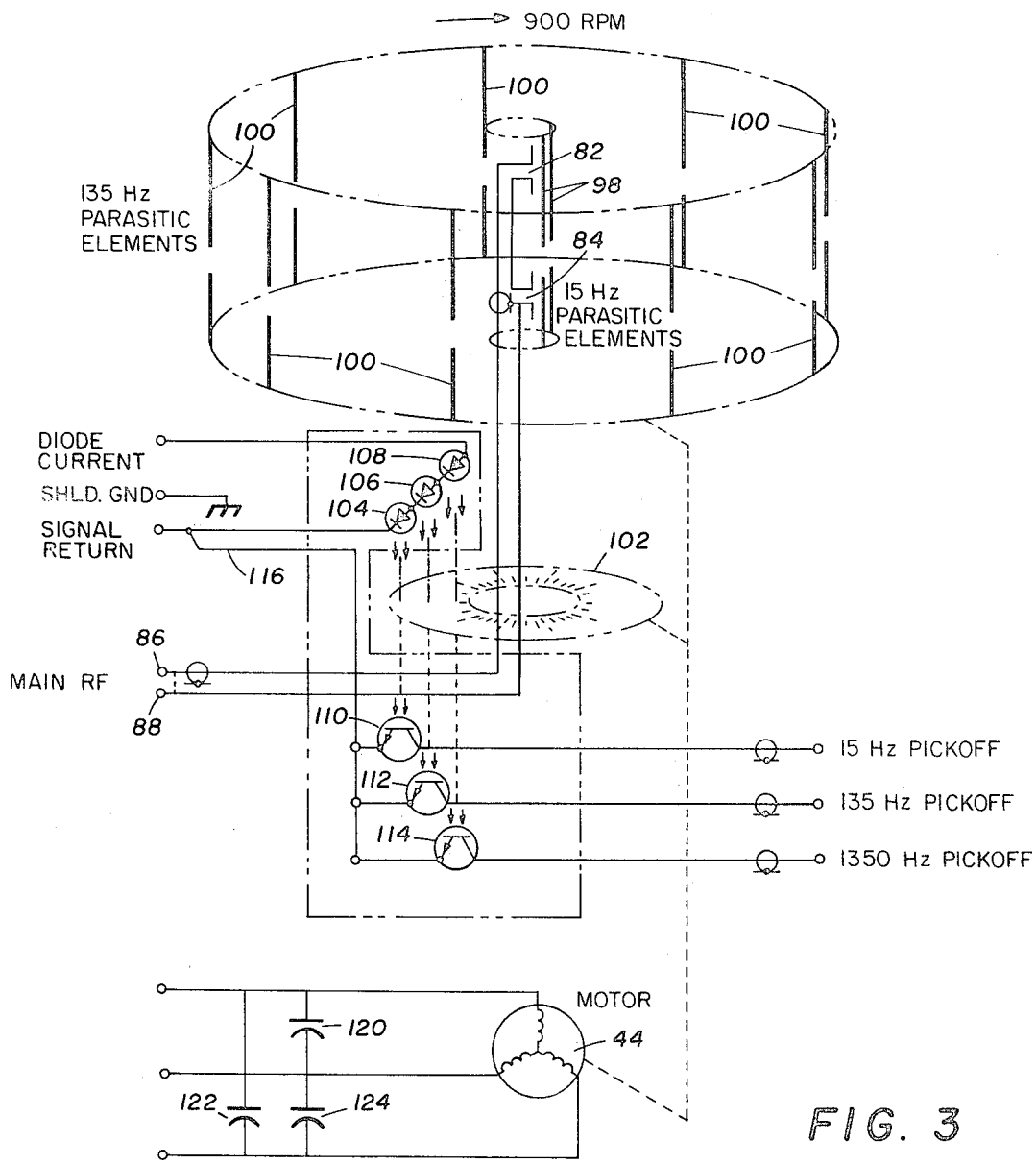
FIG. 3 is a schematic diagram of an antenna system having 15 Hz low frequency and 135 Hz high frequency parasitic elements rotating about a central antenna array.

Referring to FIG. 3, the central antenna array 36 is a multielement array consisting of two half wavelength dipoles 82 and 84 stacked on top of one another. A pulse radio frequency is fed to the terminals 86 and 88 of an RF input connector and is routed to the stacked array of dipoles 82 and 84.

Figure 4:
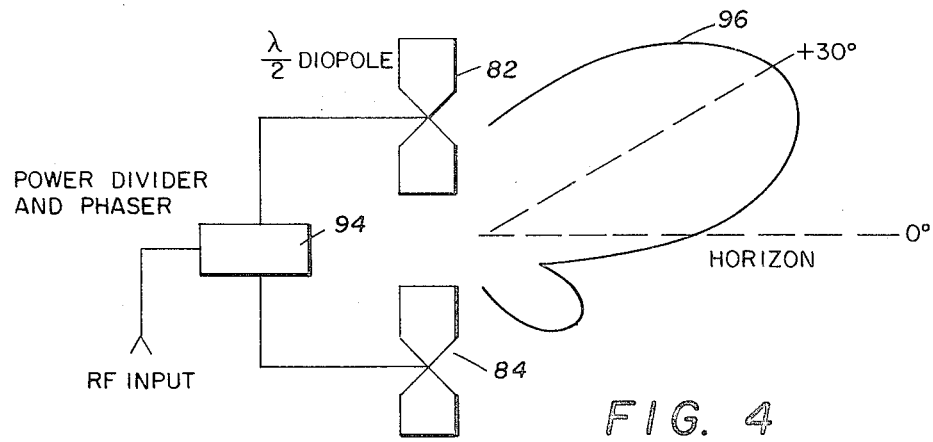
FIG. 4 is a free space energy pattern for the central antenna array of FIG. 3 showing the uptilt radiation above the horizon.

Referring to FIG. 4, the dipoles 82 and 84 are fed through a power divider/phaser 94 in such a manner that the radiation pattern is not symmetrical. The peak of the main lobe 96 is tilted upward above the horizon. As an example, the uptilt is adjusted to center the free space main lobe at approximately +30° above the horizon. The purpose of the uptilt is to reduce the energy that is radiated below the horizon. This positive angle assures that the major portion of the radiated energy is concentrated at a positive angle (i.e., above the horizon). Also, the array is vertically polarized and has a circular radiation pattern.

An aircraft receiving signals from the antenna 10 will receive a direct ray and also any reflected rays. If the direct ray and the reflected ray arrived in phase at the receiving point, the signals will add, and conversely if the rays arrive out of phase, they subtract and the resultant signal at the receiving point becomes weaker. These areas are called maxima and minima (or nulls). The depth of a null is equal to the energy of the direct ray minus the energy of the reflected ray. If the rays are equal in amplitude and opposite in phase at the receiving point, complete cancellation occurs and the resultant signal is zero. Thus, it is important that as much energy as possible be radiated above the horizon and energy below the horizon be minimized. It is the energy that is radiated from the antenna below the horizon which strikes the earth and is re-radiated to produce the null characteristic.

The radio frequency energy emitting from the central antenna array 36 has no directivity in the horizontal plane. To convey bearing information to a using aircraft, pulses from the central array are amplitude modulated. Referring again to FIG. 3, two split vertical parasitic elements 98 are mounted to rotate around the dipoles 82 and 84 at a fixed number of revolutions per second. The distance between the dipoles 82 and 84 and the parasitic elements 98 along with the speed of rotation of the parasitic elements establishes the modulation frequency applied to the pulses from the central antenna array. The parasitic elements 98 thus impose an amplitude modulation component on the broadcast pulse train from the central antenna array.

Figure 5:
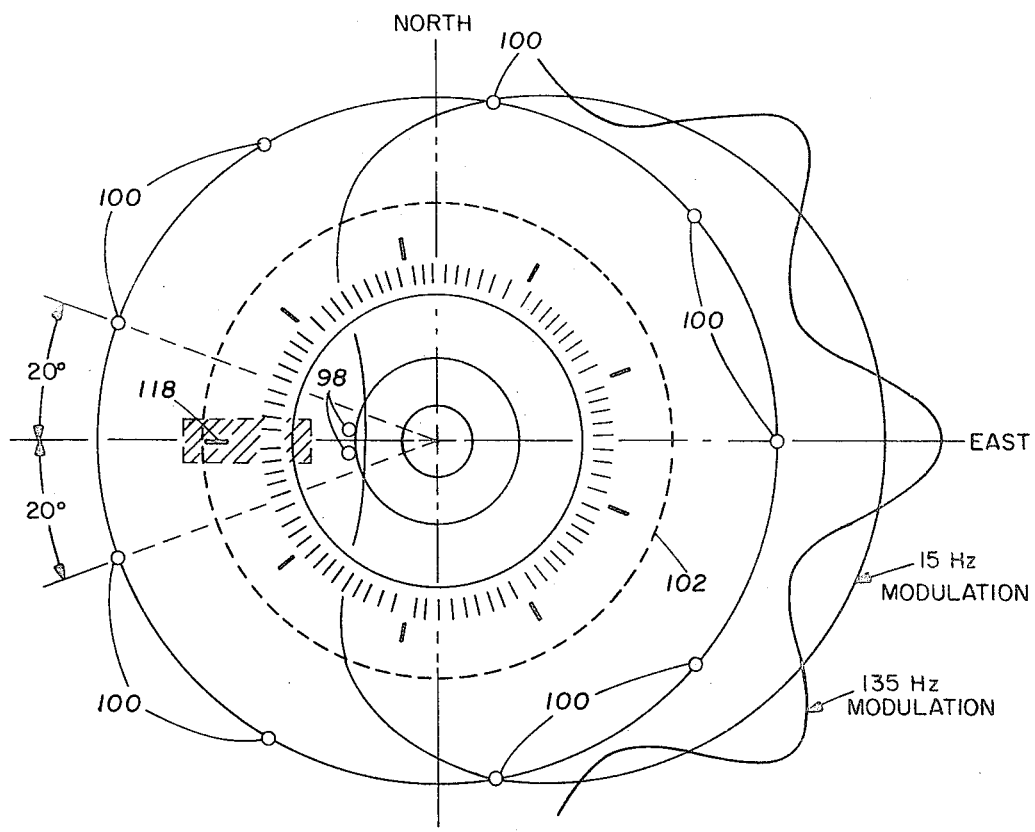
FIG. 5 is a top view of a physical phasing diagram of an antenna pattern of the type schematically shown in FIG. 3.

The basic cardioid pattern of energy from the antenna is illustrated in FIG. 5 which shows a top view of the radiation pattern. To an aircraft at a specific location, all pulses now contain an amplitude modulated signal due to the rotation of the cardioid radiation pattern. Bearing information is obtained by comparing the modulated signal with a reference signal periodically transmitted from the central antenna array 36. The phase relation between the modulated signal and the reference signal at the aircraft will be dependent on the location of the using aircraft within the cardioid pattern.

To improve the accuracy of bearing information transmitted from the central antenna array 36, a group of nine split parasitic elements 100 are mounted to rotate with the parasitic elements 98 about the dipoles 82 and 84. These nine parasitic elements rotate around the dipoles 82 and 84 with the parasitic elements 98 and modify the cardioid radiation pattern, also shown in FIG. 5. Although the basic cardioid pattern is still dominant it is altered by superimposed ripples. Using nine parasitic elements the maxima of these ripples, or minor lobes, are spaced 40° apart. To furnish a suitable reference for measuring the phase of the high frequency component of the envelope wave a coded high frequency reference burst similar to the low frequency reference burst is sequentially transmitted from the central antenna array 36.

In one model of an antenna the drive motor 44 rotated the parasitic elements 98 and 100 at 900 revolutions per minute. This produced a low frequency amplitude modulation component of 15 Hz and a high frequency modulation component superimposed of the low frequency of 135 Hz.

In order to further improve the uptilt of the radiation pattern, each of the parasitic elements 98 and 100 is made in two parts such that the upper part will have an impedance to cause current flow to be retarded with respect to current flow in the lower part when both are simultaneously excited. Thus, in FIG. 3, each of the parasitic elements 98 and 100 is shown as made up of an upper part and a lower part.

The technique used for generating the low frequency and high frequency reference trigger burst uses an infrared detecting device which when operated in conjunction with a light interrupting disc 102 creates timing pulses which are synchronized with the rotation of the parasitic elements 98 and 100. Three timing signals are generated; one conveys the phase of the low frequency modulating component, a second conveys the phase of the high frequency modulating component and the third the tenth harmonic of the high frequency component which serves to generate the periodically generated identification pulse train.

Referring to FIG. 3, the three timing pulses are generated by employing light emitting diodes 104, 106 and 108 above the light interrupting disc 102. Light passing from the emitting diodes through the rotating disc 102 impinges on photosensitive transistors 110, 112 and 114 as part of three trigger amplifiers. In the configuration shown, each of the transistors has an emitter electrode connected to ground through a line 116 which in turn connects to the reference trigger amplifier 64. Individual collector electrodes of the transistors are also connected to inputs of the reference trigger amplifier 64. The amplifier 64 serving to increase the signal level for transmission to the control/transfer unit 16.

The rotating light interrupting disc 102 is a metal disc with transparent slots. This disc is schematically illustrated in FIG. 5 superimposed with the cardioid radiating pattern from the central antenna array. Slots are opened on three diameters with the single slot 118 providing the low frequency timing pulses. The intermediate diameter slots provide the high frequency modulation component and inner diameter slots provide the tenth harmonic of the high frequency component for identity purposes.

In the model of the antenna previously referred to wherein the low frequency component was 15 Hz and the high frequency component was 135 Hz, the outermost diameter of the disc 102 generates a 15 Hz timing signal for the low frequency reference signal, the middle diameter generates the 135 Hz timing signal for the high frequency reference pulses and the innermost diameter generates a 1,350 Hz timing signal for identification. With nine parasitic elements 100, each are displaced 40° and the slots on the middle diameter also have a 40° separation. The inner diameter slots have a 4° separation.

In operation of the trigger sensor, a trigger pulse is generated by the applicable photosensitive transistor each time a slot passes between the light source and the transistor. A bracket holding the light sources and the photosensitive transistors is adjustable to obtain proper reference alignment between the rotating parasitic elements 98 and 100 and the reference pulses.

Also located within the antenna 10 and connected to the control unit 14 are motor power factor correcting capacitors 120, 122 and 124. Each of these capacitors is located across two of the three phase input lines of the motor 44. They compensate for the inductive load of the motor such that drive circuitry of the antenna control 14 sees an essentially resistive type load. Typically, the motor 44 may be a three phase synchronous motor to provide the required timing operation.

Figure 6:
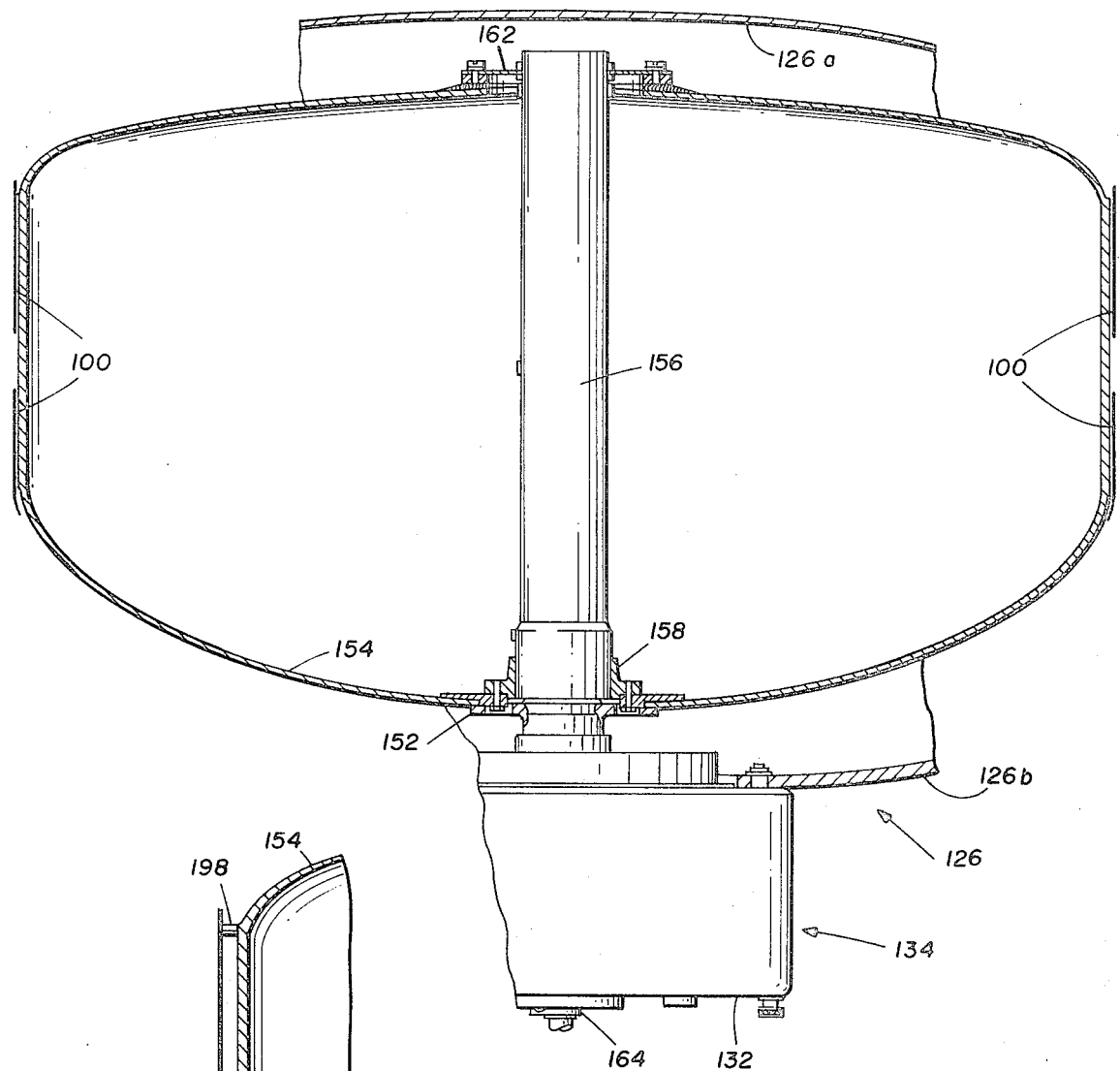
FIG. 6 is a cross-section of an antenna system having a rotating drum supporting parasitic elements revolving about a central antenna array.
Figure 7:
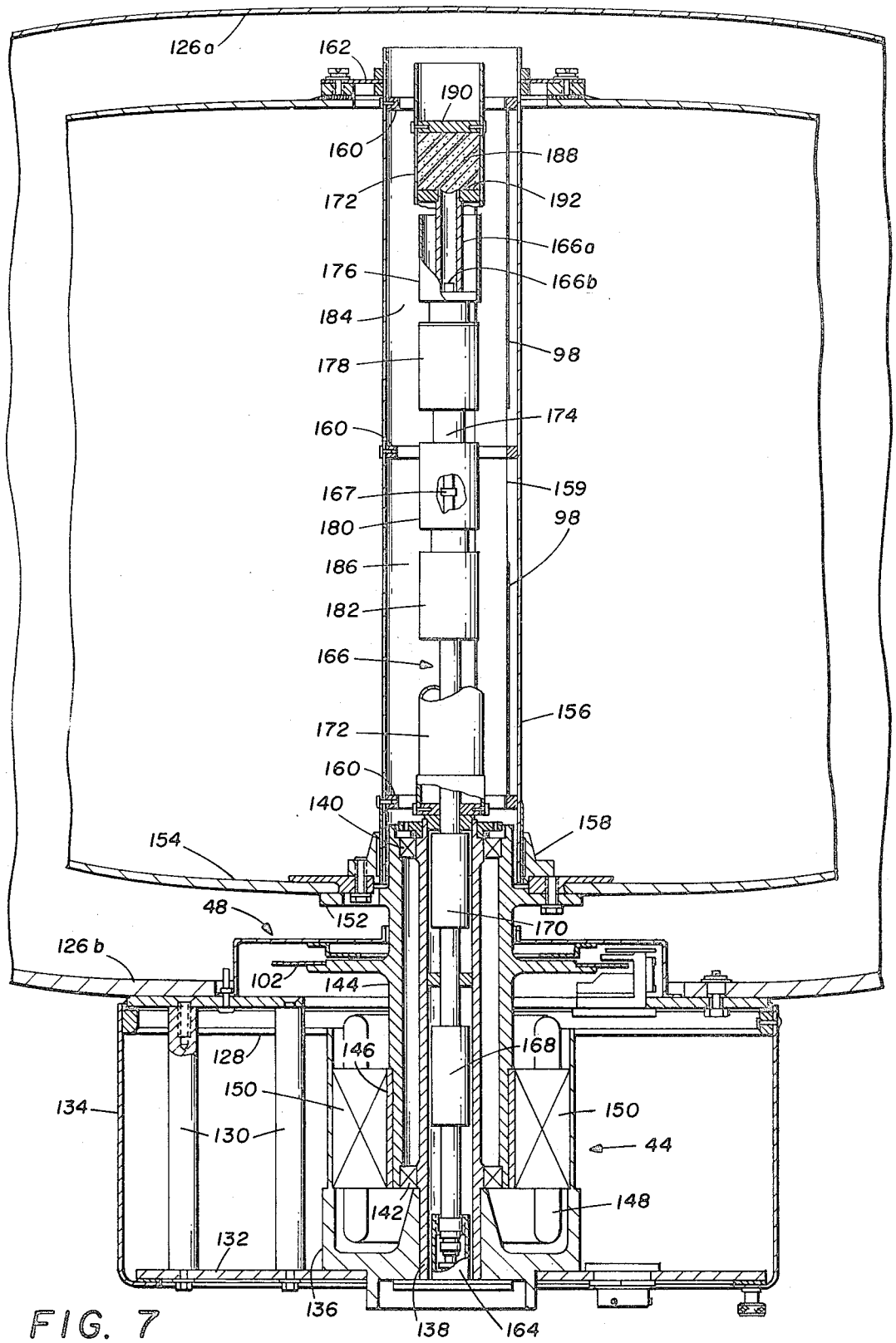
FIG. 7 is an enlarged view of the central antenna array of FIG. 6.

Referring to FIGS. 6 and 7, there is shown in cross-section one embodiment of an antenna in accordance with the present invention. The central antenna array 38 and the parasitic elements 98 and 100 are closed within a radome 126 comprising an upper half 126a fastened to a lower half 126b to form a weather tight enclosure. This enclosure is bolted to a mounting plate 128 of a pedestal that forms a housing support. The housing support also includes spacer bars 130 bolted to a lower mounting plate 132. A shroud 134 encloses the structure which contains the drive motor 44 and feed cable connections to the central antenna array 36. With reference to FIG. 1, the lower mounting plate 132 is supported on the tripod 12.

In the embodiment of the antenna shown in FIGS. 6 and 7, all metal support parts are within a diameter no greater than the diameter of the shroud 134. By restricting the use of metallic parts to the smallest diameter possible excitation of parts having spillover characteristics which illuminate regions on the underside and also at high angles on the topside is eliminated. Particular effort was made to keep all parts of the rotating cylinder 154 of nonmetallic material except at points of attachment to the drive motor 44. The same holds true for materials of the radome 126.

With emphasis on FIG. 7, the motor housing 136 is attached to the lower mounting plate 132 and includes a motor shaft 138 secured to the frame 136 and fixed in position relative to the housing. At the upper and lower end of the shaft 138 are positioned bearings 140 and 142. Mounted to these bearings is a rotor tube 144 which rotates with respect to the shaft 138 and the antenna housing. At the lower end of the rotor tube 144 there is press fit and affixed by means of an adhesive a rotor sleeve 146 which functions as the armature of a conventional three phase synchronous motor. A field coil 148 is included within the motor housing 136 and is wound on a stater 150 to provide the rotating magnetic field to the rotor sleeve 146. The impedance of the motor structure to the radiated energy from the central array 36 provides additional uptilt of the radiation pattern as shown in FIG. 4.

The upper part of the rotor tube 144 includes a flange 152 that supports a rotating drum 154. Preferably, the rotating drum 154 is of a thin dielectric material, such as fiberglass. It is a spiral wound support on which there is mounted the nine split parasitic elements 100 on the thin walls thereof. As explained previously, the parasitic elements 100 are of two parts with the upper part longer than the lower. Typically, the parasitic elements 100 may be a wire having a resistance of 51 ohms per foot with the upper part slightly longer than a half wavelength of the mid-band operating frequency and the lower part slightly less than a half wavelength of the operating frequency. The nine wires are spaced around the drum at 40° intervals and, in the embodiment shown, are adhered to the outside surface with an adhesive.

Also rotating with the drum 154 is a support tube 156 that is attached to the flange 152 by means of a collar 158. The support tube 156 is also of a thin dielectric material, such as fiberglass, and supports the split parasitic elements 98 on spaced filaments 159 extended between collars 160. To maintain a spaced relationship between the drum 154 and the tube 156, the upper end of the tube is fitted with a positioning ring 162 fastened to the upper wall of the drum 154.

The central antenna array 36 connects to the coaxial cable 50 through a connector 164 and a coaxial line 166 including a main transmission line 166a and a center conductor 166b. Positioned along the line 166 are radio frequency chokes 168 and 170 which function to add to the uptilt of the radiation pattern from the antenna. Each of the chokes 168 and 170 are one-quarter wavelength long at the mean operating frequency and are spaced apart along the line 166 a quarter wavelength and have a general outline in the form of a cylinder with one end closed. The chokes 168 and 170 are spaced from the central array 36 such that energy transmitted from the central array is in phase with the intended signal from the radiation feed point 167.

Within the rotating drum 154, the central antenna array 36 is positioned in a low loss antenna tube 172 fastened to the motor shaft 138. A secondary transmission line or distribution transmission line 174 is arranged around the main transmission line. This secondary transmission line is provided with radiation skirts 176, 178, 180 and 182. Skirts 176 and 182 have a configuration of a cylinder with one end closed, see skirt 176, the skirt 182 opening downward. Energy from a main feed point 167 of the antenna is fed into the secondary transmission line 174 and divided in equal parts in both directions along the main transmission line 166a. Equal portions of the energy from the main feed point arrive at the half wave radiator points 184 and 186 with the skirts 176, 178, 180 and 182 radiating the energy from the antenna. Each of the skirts is substantially one-quarter wavelength long. Energy from the radiator points 184 and 186 is radiated by the skirts 176, 178 180 and 182 with each skirt being arranged along the transmission line 174 at one-quarter wavelength intervals. Skirts 176 and 182 are separated from the transmission line 174 such that energy beyond the one-quarter wavelength skirt circulates through the skirt region thus providing 180° of phase shift and thereby contributing to a cancellation of RF leakage beyond that point. Thus, the net radiating area provides half wave radiators.

At the top of the main transmission line 166a, there is positioned an energy absorbing cavity 188 filled with an absorbing material, such as polyurethane foam. The cavity 188 is formed within the tube 172 by discs 190 and 192.

As constructed, the central antenna array 36 is two stacked dipole elements having a vertically polarized circular radiation pattern. As the radiated energy leaves the central array it passes through the cylindrical tube 172 and illuminates the tube parasitic elements 98 which provide a low frequency amplitude modulation of the radiated energy. The radiated energy continues through the cylindrical tube 156 to the periphery of the fiberglass rotating drum 154 where the nine parasitic elements 100 are illuminated. These elements act to further modulate the radiated energy to superimpose a high frequency component on the low frequency component provided by the parasitic elements 98.

For symmetry purposes to provide equal current into the elements of the central antenna array, a section of the main transmission line 166a extends above the center conductor 166b. The line 166a has leakage currents which are phased by the tube length. Thus, the total carrier radiation system extends from the top of the main transmission line 166a down to a point in the rotating mechanism of the motor 44. This length is considerably greater than the length of the antenna elements in the central array. Although these extreme portions carry very small currents, they are effective in modifying the radiation at right angles to the system to further improve the direct radiation pattern, that is, to add to the uptilt of the radiation pattern above the horizon.

The nonmetallic underside of the rotating drum 152 and the radome 128 also prevents RF spillover, thereby reducing the energy radiated below the horizon to further improve the percentage of direct radiation above the horizon from the system.

Figure 8:
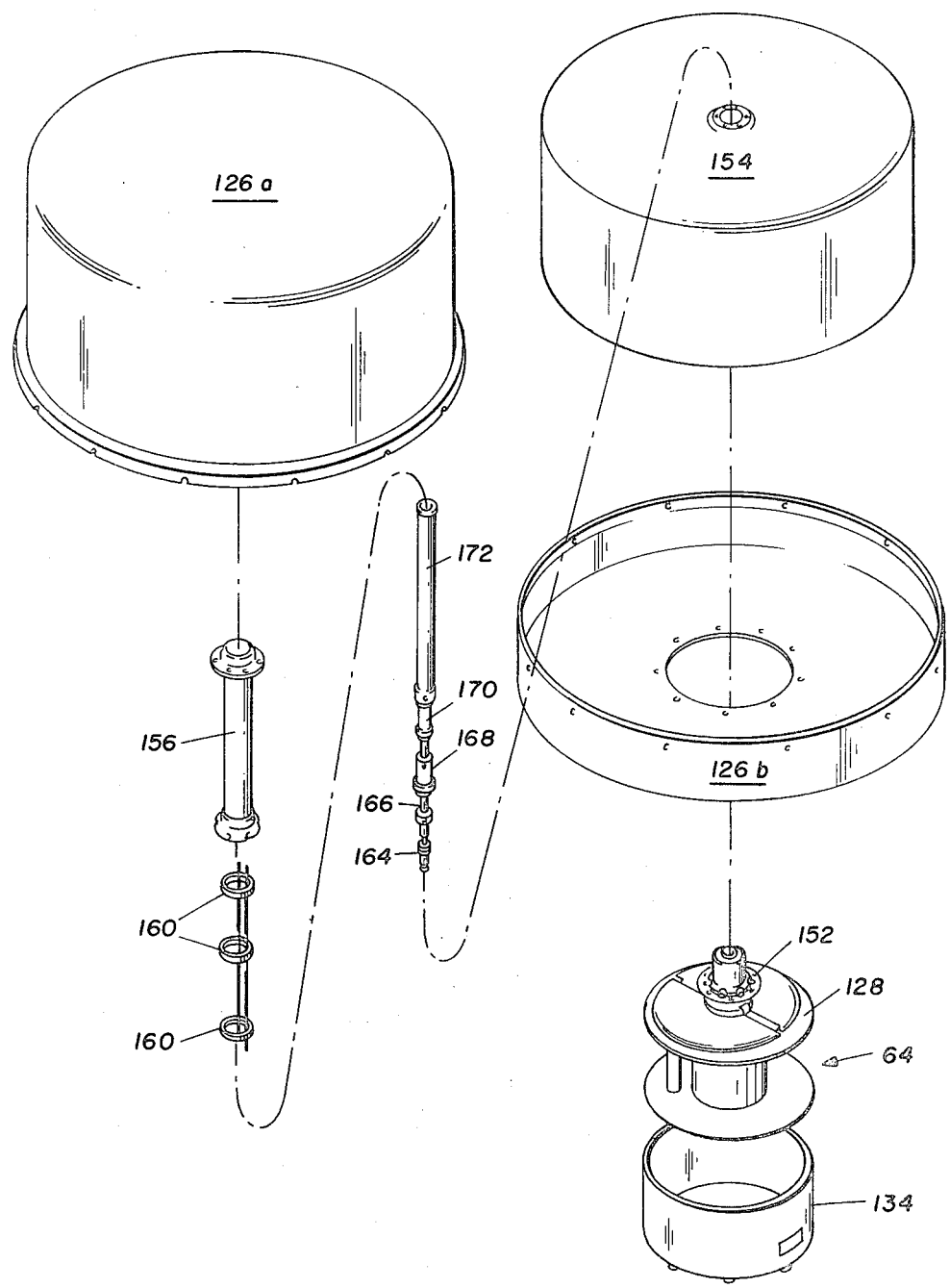
FIG. 8 is an exploded view of the antenna system shown in FIG. 6.

Referring to FIG. 8, there is shown an exploded view of the antenna system including the upper part 126a of the radome 126 and the lower part 126b which attaches to the support mounting plate 128. Above the mounting plate 128, as also shown in FIG. 7, there is located the reference trigger sensor 48. The light disc 102 is attached to the rotor tube 144 for rotation therewith.

In assembly of the antenna, the support tube 172 with all the elements of the central antenna array 36 included therein is attached to the nonrotating motor shaft 138 at the center top of the flange 152. The chokes 168 and 170 and the feed line 166 pass through the motor shaft 138. This assembly along with the radome 126 are fixed in position with respect to the antenna housing support. The parasitic support tube 156 with the parasitic elements 98 assembled thereto is fastened to the rotating drum 154 with the complete assembly mounted to the flange 152 for rotation with respect to the central antenna array 36. The reference trigger sensor 48 remains stationary in the housing and contains the photodiodes 104, 106 and 108 and the phototransistors 110, 112 and 114 with the disc 102 rotating with the rotating drum 154.

Figure 9:
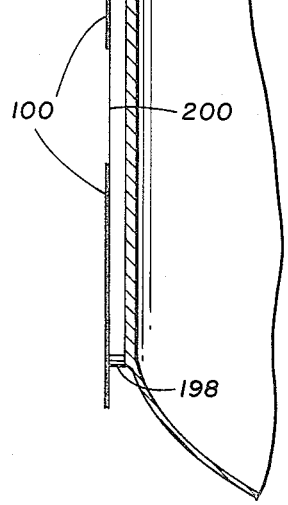
FIG. 9 shows an alternate embodiment for mounting the parasitic elements for improved uptilt radiation.

Referring to FIG. 9, there is shown an alternate embodiment for mounting the parasitic elements 100 to the rotating drum 154. Spacers 198 are attached to the thin walls of the drum at each location of an element 100. Between the spacers 198 there is stretched a filament 200 which may be of nylon, mylar or similar material. The two parts of the parasitic elements are then attached to the filament 200 with the longest part adjacent the upper spacer.

An arrangement like that shown in FIG. 9 mounts the elements 100 in essentially the same manner as shown in FIG. 7 for the elements 98. A filament mounting away from the surface of the rotating drum 154 either on the inside or outside of the rotating drum 154 has been found to further increase the uptilt pattern of the radiation pattern from the central antenna array.

While several embodiments of the invention, together with modifications thereof, have been described in detail herein and shown in the accompanying drawings, it will be evident that various further modifications are possible without departing from the scope of the invention.

What is claimed is:

1. An antenna system for obtaining uptilt of radiation above the horizon and energized from a radio frequency source, comprising in combination:
    a central antenna array including:
        a. a coaxial transmission line connected to the radio frequency source and having a feed point,
        b. a first energy radiator coupled to said feed point along the transmission line to have a current therein with a lagging phase relationship with reference to a current in the feed point, and
        c. a second energy radiator coupled to said feed point along the transmission line to have a current therein with a leading phase relationship with reference to current in a feed point and said first radiator, and
    at least one radio frequency choke positioned along the transmission line of said antenna array in a spaced relationship with the second radiator to produce a leading current with reference to a current in the second radiator along said transmission line between the second radiator and said choke to uptilt the radiation pattern from the antenna system.

2. A radio frequency antenna system as set forth in claim 1 including a cavity at the end of said central antenna array filled with an energy absorbing material.

3. An antenna system for obtaining uptilt of radiation above the horizon and energized from a radio frequency source, comprising in combination:
    a support including a drive motor,
    a central antenna array mounted to the support and including:
        a. a feed point connected to the radio frequency source,
        b. a first energy radiator coupled to said feed point to have a current therein with a lagging phase relationship with reference to a current in the feed point, and
        c. a second energy radiator coupled to said feed point to have a current therein with a leading phase relationship with reference to current in the feed point and said first radiator,
    a plurality of spaced lagging current reflectors positioned radially from the first radiator and responsive to energy therefrom to generate a current therein with a lagging phase relationship with reference to a current in said first radiator and said feed point,
    a plurality of spaced leading current reflectors positioned in alignment with the lagging current reflectors and radially from the second radiator and responsive to energy therefrom to generate a current therein with a leading phase relationship with reference to the current in said second radiator and said feed point, and
    a support drum of a dielectric material with one end coupled to the drive motor and the lagging and leading current reflectors attached to the wall of said drum.

4. A radio frequency antenna system as set forth in claim 3 wherein said drum of dielectric material further includes spacers mounted to said drum with a filament stretched between pairs of said spacers and the leading and lagging current reflectors attached to said filaments.

5. An antenna system as set forth in claim 3 wherein said drum has a diameter substantially larger than a maximum dimension of said support to minimize radiation reflected from said support to said spaced current reflectors.

6. An antenna system as set forth in claim 3 including a coaxial transmission line with the radiating feed point as a part thereof and said radiators positioned along the transmission line.

7. An antenna system as set forth in claim 6 including at least one radio frequency choke coupled to the transmission line of said antenna array in a spaced relationship with the second radiator to produce a leading current with reference to a current in the second radiator along said transmission line between the second radiator and said choke.

8. An antenna system for obtaining uptilt of radiation above the horizon and energized from a radio frequency source, comprising in combination:
    a central antenna array including:
        a. a feed point connected to the radio frequency source,
        b. a first energy radiator coupled to said feed point to have a current therein with a lagging phase relationship with reference to a current in the feed point, and
        c. a second energy radiator coupled to said feed point to have a current therein with a leading phase relationship with reference to current in the feed point and said first radiator,
    a plurality of spaced lagging current reflectors positioned radially from the first radiator and responsive to energy therefrom to generate a current therein with a lagging phase relationship with reference to a current in said first radiator and said feed point, and
    a plurality of spaced leading current reflectors positioned along the same radial as the lagging current reflectors and radially from the second radiator and responsive to energy therefrom to generate a current therein with a leading phase relationship with reference to the current in said second radiator and said feed point.

9. A radio frequency antenna system as set forth in claim 8 including support means including a drum of a dielectric material with one end coupled to a drive motor and the leading and lagging current reflectors attached to the walls of said drum.

10. A radio frequency antenna system as set forth in claim 8 wherein the lagging current reflectors have an impedance to cause current flow to be retarded with respect to current flow in the leading current reflectors when both are excited simultaneously.

11. A radio frequency antenna system as set forth in claim 8 wherein the lagging current reflectors are longer than a half wavelength of the electromagnetic wave radiating from said central antenna array and the leading current reflectors are shorter than a half wavelength.

12. An antenna system as set forth in claim 8 including a coaxial transmission line with the radiating feed point as a part thereof and said radiators positioned along the transmission line.

13. An antenna system as set forth in claim 12 including at least one radio frequency choke positioned along the transmission line of said antenna array in a spaced relationship with the second radiator to produce a leading current with reference to a current in the second radiator along said transmission line between the second radiator and said choke.

14. An antenna system as set forth in claim 8 wherein said first energy radiator and said second energy radiator are half wavelength dipoles.

15. A radio frequency antenna system for obtaining uptilt of radiation above a reference line, comprising in combination:
   a support including a drive motor,
   a central antenna array of two stacked omni-directional dipole radiators mounted to said support to be fixed in position with respect thereto along a coaxial transmission line having a radiating feed point energizing one dipole to have a leading current with respect to the feed point and the second dipole to have a lagging current with espect to the feed point to radiate a pattern above a reference line,
   at least one radio frequency choke positioned along the transmission line of said antenna array at the support and in proximity to one of said dipoles to reflect radiation along the transmission line from said omni-directional antenna to further uptilt the radiation pattern from said central antenna array,
   a plurality of spaced, parasitic reflectors radially positioned from said central antenna array, and
   support means for positioning said plurality of parasitic reflectors and coupled to the drive motor of said support and rotated thereby to produce a rotation of said reflectors around the central array for modulating electromagnetic waves radiated therefrom.

16. A radio frequency antenna system as set forth in claim 15 wherein said support means includes a drum of a dielectric material with one end coupled to the drive motor and the parasitic antenna element attached to the wall of said drum.

17. A radio frequency antenna system as set forth in claim 15 wherein said support means includes a drum of a dielectric material with one end coupled to the drive motor and further including spacers mounted to the walls of said drum with a filament stretched between pairs of said spacers and the reflectors attached to said filaments.

18. A radio frequency antenna system for obtaining uptilt of radiation above a reference line, comprising in combination:
   a support including a drive motor,
   a central antenna array of omni-directional dipole radiators mounted to said support to be fixed in position with respect thereto, one of said radiators having a lagging current with reference to a feed point and the second radiator having a leading current with reference to the feed point to radiate a pattern above the reference line,
   a first plurality of two-part, spaced, parasitic reflectors radially positioned from said central antenna array, one part of each of said reflectors having a length greater than the second part with the longer of the two positioned radially from the first of said radiators and having a lagging current with reference to a current in said first radiator and said feed point and the second part positioned radially from the second of said radiators and having a leading current with reference to a current in said second radiator and said feed point to further uptilt the radiation pattern from said central array,
   a second plurality of spaced parasitic reflectors radially positioned between said central antenna array and said first plurality of parasitic reflectors,
   first support means for positioning said first plurality of parasitic reflectors and coupled to the drive motor of said support and rotated thereby to provide rotation of said reflectors around the central array for modulating the electromagnetic waves radiated therefrom at a first frequency, and
   second support means for positioning said second plurality of parasitic reflectors and coupled to the drive motor of said support and rotated thereby to provide rotation of said reflectors around the central array for modulating electromagnetic waves radiated therefrom at a second modulation frequency.

19. A radio frequency antenna system as set forth in claim 18 wherein each of said second plurality of spaced parasitic reflectors includes a first part having a length greater than the second part with the longer of the two parts positioned above the reference line to uptilt the radiation pattern from said central antenna array.

20. A radio frequency antenna system as set forth in claim 18 wherein said first support means includes a drum of a dielectric material with one end coupled to the drive motor and the parasitic reflectors attached to the walls of said drum.

21. A radio frequency antenna system as set forth in claim 18 wherein said first support means includes a drum of a dielectric material with one end coupled to the drive motor and further including spacers mounted to the walls of said drum with a filament stretched between pairs of spacers and the two parts of each parasitic reflector attached to said filaments.

22. A radio frequency antenna system as set forth in claim 18 including at least one radio frequency choke coupled to the omni-directional antennas of said central array to provide a main lobe beam angle above the reference line.

* * * * *